March 27, 1951 C. W. KELSEY 2,546,265
LAWN MOWER AND LAWN MOWER ATTACHMENT FOR TRACTORS
Filed May 22, 1948 3 Sheets-Sheet 2

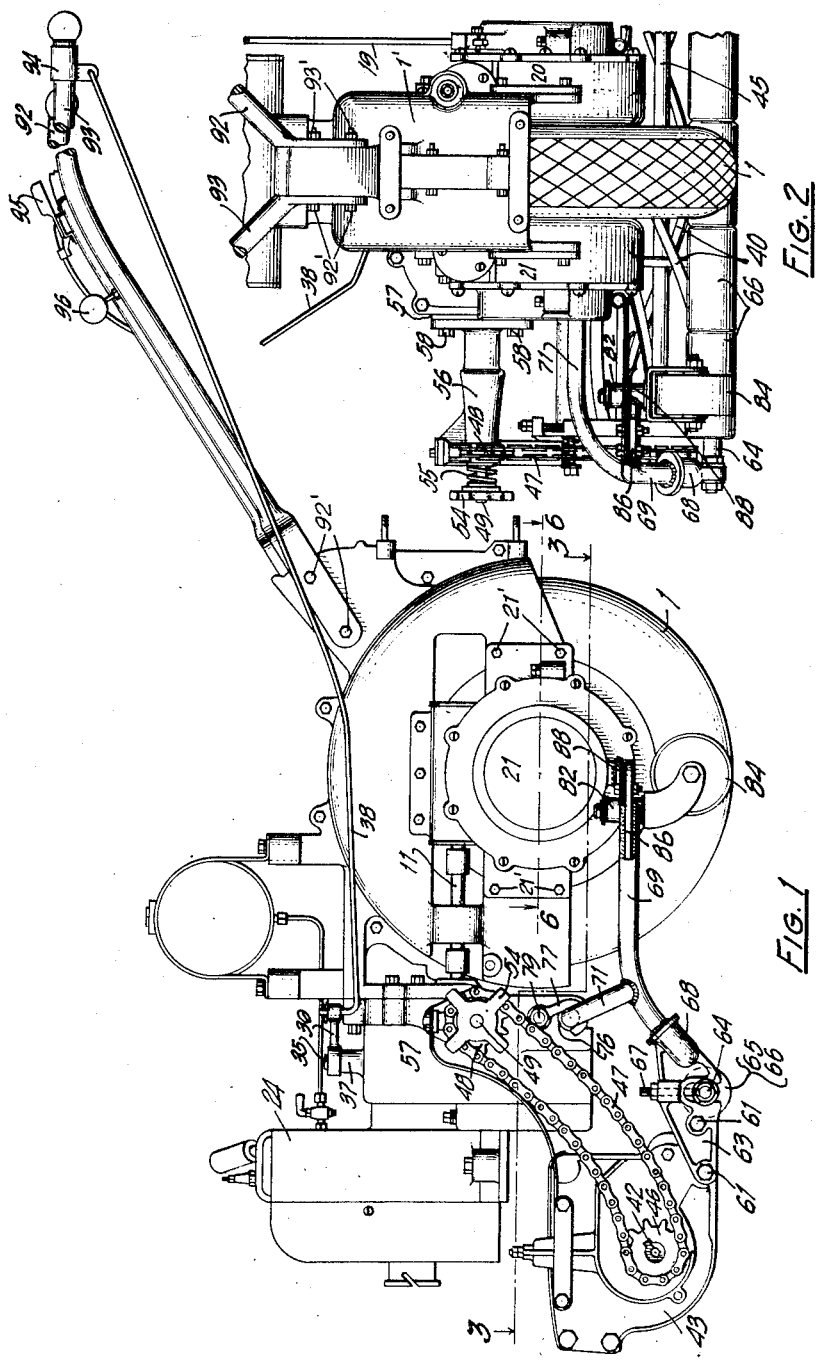

INVENTOR:
Cadwallader W. Kelsey
by
His ATTORNEY.

March 27, 1951  C. W. KELSEY  2,546,265
LAWN MOWER AND LAWN MOWER ATTACHMENT FOR TRACTORS
Filed May 22, 1948  3 Sheets-Sheet 3
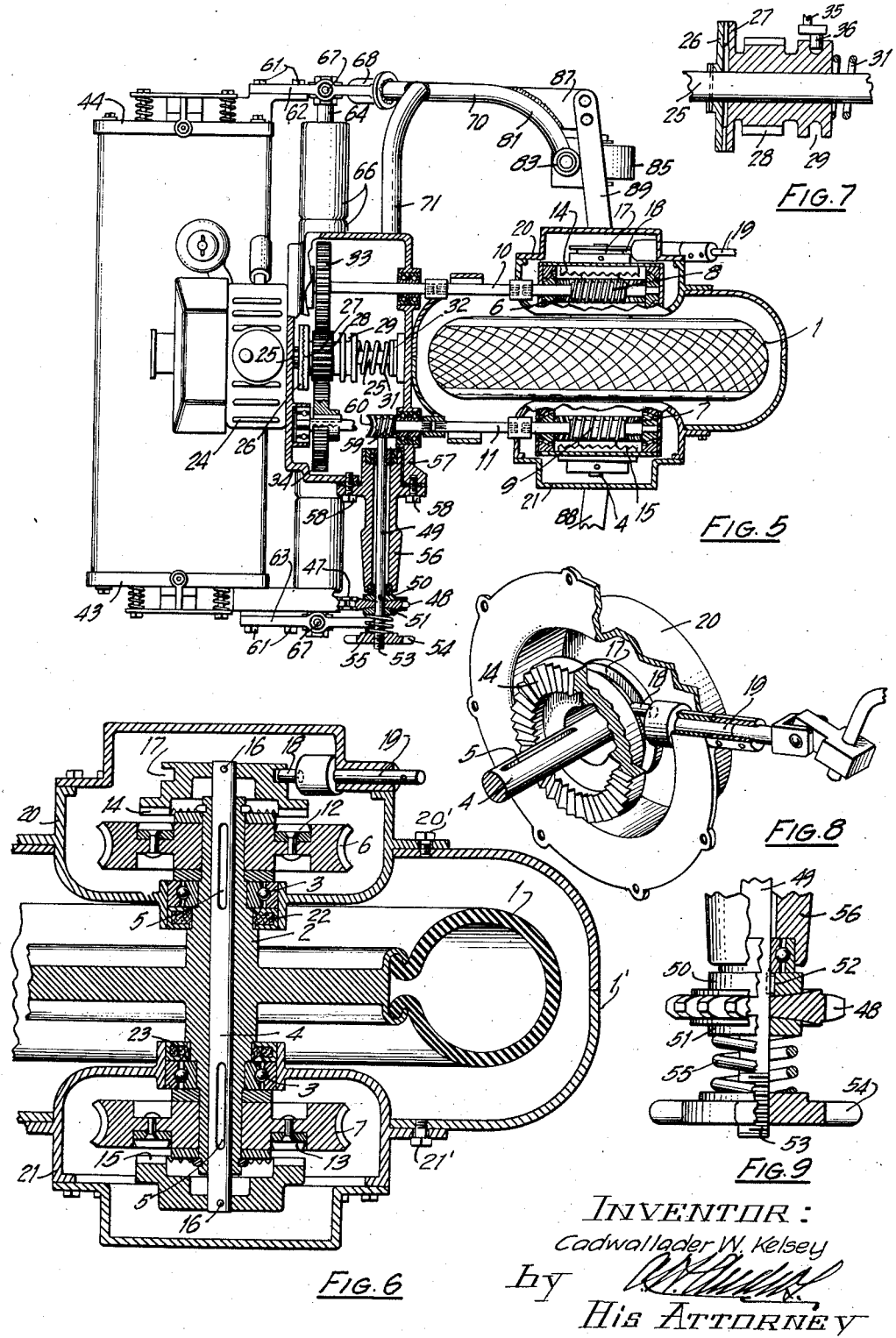
INVENTOR:
Cadwallader W. Kelsey
by
His Attorney Patented Mar. 27, 1951

2,546,265

UNITED STATES PATENT OFFICE 2,546,265

LAWN MOWER AND LAWN MOWER ATTACHMENT FOR TRACTORS

Cadwallader W. Kelsey, Troy, N. Y.

Application May 22, 1948, Serial No. 28,605

9 Claims. (Cl. 56—26)

My invention relates to lawn mowers and particularly to lawn mower attachments for small tractors of the wheelbarrow or single wheel type.

One of the objects of my invention is to provide a lawn mower which may be readily attached to or detached from a tractor of the wheelbarrow type. Another object is to provide a lawn mower attachment of this character which when applied to such a tractor will function as a stabilizer therefor. Another object is to provide a lawn mower which is flexibly attached to a tractor so that it may move up and down about a horizontal axis to facilitate the mowing of lawns having comparatively abrupt changes in grade such as are encountered at the top and foot of slopes. Another object is to provide a power driven lawn mower having change-speed gears in which the rate at which the mower is propelled over the ground at a given engine speed may be substantially changed or varied without varying the speed at which the cutter bars are revolved. Another object is to provide a power driven lawn mower in which the blades of the mower are operatively connected to the driving mechanism through a clutch which may be readily adjusted to slip automatically in the event the cutting blades encounter obstructions which prevent the turning thereof.

I accomplish these objects by means of the novel elements and the combinations and arrangements thereof described below and illustrated in the accompanying drawings in which—

Fig. 1 is a side elevation view of my mower;

Fig. 2 is a fragmentary, rear elevation view thereof;

Fig. 5 is a fragmentary, plan view of the mower, illustrating a portion of the tractor with parts broken away and parts in section, and illustrating part of the driving mechanism.

Fig. 6 is an enlarged section of Fig. 1 in about the plane 6—6;

Fig. 7 is an enlarged section view of the main clutch;

Fig. 8 is a fragmentary, perspective view of the clutch shifting mechanism by means of which the speed of the tractor is changed; and Fig. 9 is an enlarged view, partially in section, of the adjustable clutch through which the mower blades are driven.

Figure 3:
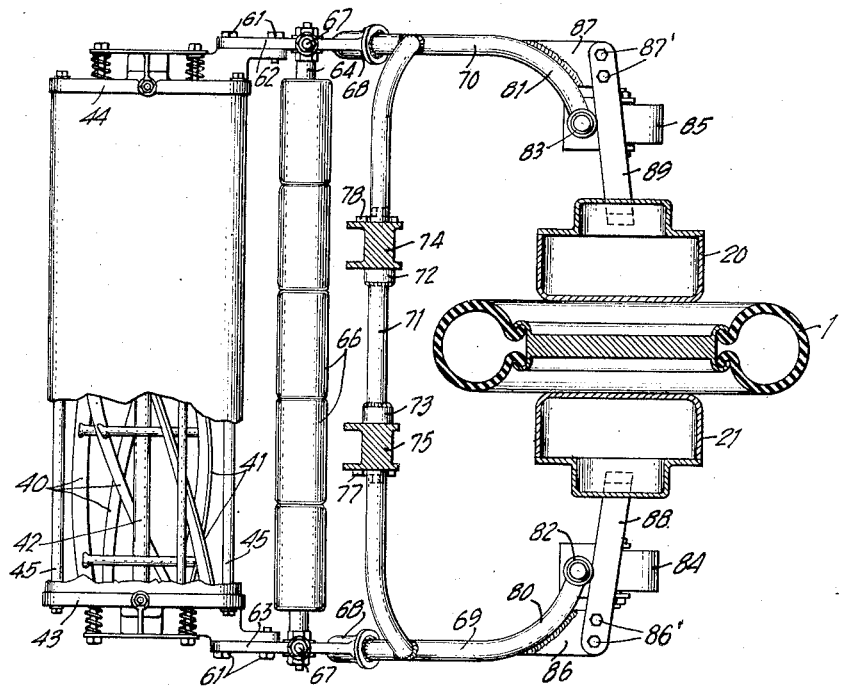
Fig. 3 is a section of Fig. 1 in the plane 3—3 with certain portions thereof broken away.

Referring to the drawings, my device comprises a tractor having a single, centrally-disposed ground wheel 1 provided with a hollow hub 2 which is rotatably mounted in bearings 3. A clutch shaft 4 is slidably mounted longitudinally within the hub 2 but is drivingly connected to the hub by keys or splines 5. Rotatably mounted on the hub 2, on opposite sides of the ground wheel, are worm wheels 6 and 7 which are always driven, when the machine is in motion, by the worms 8 and 9, respectively (see Fig. 5), mounted on shafts 10 and 11, respectively. The cooperating worms and worm wheels differ in pitch so that the ground wheel may be driven at a different speed by the worm 8 than by the worm 9 with the same engine speed. The worm wheels 6 and 7 are provided with tractor clutch members 12 and 13, respectively, which are adapted to cooperate with tractor clutch members 14 and 15, respectively, both of which are secured to the sliding shaft 4 by means of pins 16, or otherwise. The clutch members 14 and 15 which are secured to the shaft 4 are so spaced that, in neutral, neither is engaged with the clutch member on the adjacent worm wheel and, when one of them is in engagement with the clutch member on the worm wheel adjacent thereto, the other is out of engagement with the clutch member on the worm wheel adjacent thereto. One of the clutch members 14 is provided with a collar 17 which cooperates with a pin 18 eccentrically mounted on the shaft 19. Thus, by turning the shaft 19, the clutch members 12 and 14 may be engaged or the clutch members 13 and 15 may be engaged to change the forward speed of the tractor without changing the engine speed. The worm wheels and the clutches described above are enclosed in separate housings 20 and 21 connected on opposite sides of the ground wheel cover 1' by bolts 20' and 21' which may be partially filled with oil or grease, and which is prevented from leaking along the hub by means of the grease retainers 22 and 23.

Mounted in front of the ground wheel is an internal combustion engine 24 having a main drive shaft 25 on which is secured one of the main clutch members 26. Cooperating with the clutch member 26 is a second main clutch member 27 formed integral with the pinion 28 and the clutch collar 29, and which is slidable on the shaft 25. A helical spring 31 is compressed between the clutch collar and a thrust bearing 32 and normally urges the clutch members 26 and 27 into cooperative engagement. The pinion 28 drives shaft 10 through gear 33 and shaft 11 through gear 34. Thus, when clutch members 26 and 27 are engaged, worms 8 and 9 are driven continuously and, when both of the clutches, which cooperate with the worm wheels are disengaged, the worm wheels merely rotate freely on the hub 2 of the ground wheel.

The main clutch, as pointed out above, is normally held in engagement by means of the spring 31 but is disengaged by turning the shaft 35 (see Fig. 7) on which the pin 36, which cooperates with the clutch collar 29, is eccentrically mounted. The shaft 35 is mounted in the bearing 37 (see Fig. 1), and is turned by means of the rod 38 which cooperates with the arm 39 secured to the shaft 35.

The mower attachment is shown in detail in Figs. 1, 2, 3, 4, 5 and 9, and comprises a plurality of blades 40 having helical cutting edges 41. The blades are mounted on a shaft 42 which, in turn, is mounted in the ends 43 and 44 of a frame formed by said ends and the tie bars 45. Mounted on the end of the shaft 42 is a sprocket 46 (see Fig. 1) which is driven by means of a chain 47 from a sprocket 48.

Referring now more particularly to Figs. 5 and 9, the sprocket 48 is rotatably mounted on the shaft 49 but may be frictionally connected to said shaft by means of mower clutch elements 50 and 51 which cooperate therewith. The clutch element 50 is keyed to the shaft 49 by means of the key 52 while the clutch element 51 may rotate freely on the shaft 49.

The outer end of the shaft 49 is threaded, as shown at 53, to receive the clutch-adjusting hand wheel 54. Compressed between the hand wheel and the clutch element 51 is a helical spring 55. By turning the hand wheel 54 the compression on spring 55 may be varied and thus the pressure of the clutch elements 50 and 51 on opposite sides of the sprocket 48 may be varied. In other words, the sprocket 48 provides a frictional drive for the cutter blades which may be so adjusted that, in the event sticks, stones or other things are encountered by the cutting blades which prevent their free turning, the sprocket 48 will simply slip on its shaft and thus prevent damage to the blades and undue shock on the engine and driving mechanism.

The shaft 49 which drives the sprocket 48 is mounted in a housing 56 which is secured to the side of the casing 57 by means of the cap screws 58, and is driven from the shaft 11, preferably by spiral gears, one of which is mounted on the shaft 11, the other one of which is mounted on the shaft 49. In the drawing, however, merely for the purpose of illustrating a drive, I have shown a worm 59 mounted on the shaft 11 which cooperates with the worm wheel 60 on the shaft 49.

Figure 4:
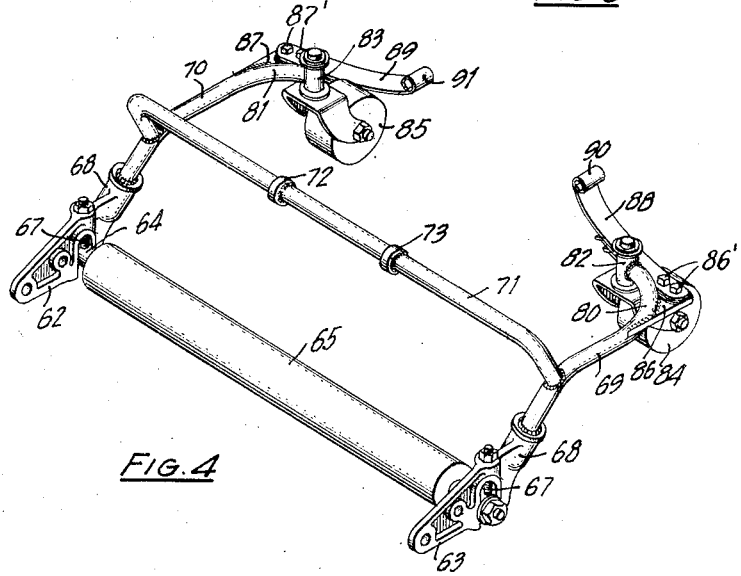
Fig. 4 is a perspective view of a portion of the mower attachment.

In order to attach the mower to the tractor I provide a mower frame structure, such as illustrated in Figs. 3 and 4, and which is secured to the frame of the mower by means of bolts or cap screws 61.

Adjustably mounted in the members 62 and 63 of the frame is a shaft 64 on which the ground roller 65 is rotatably mounted. Preferably, the roller is formed of a plurality of separate rollers, as shown at 66 in Figs. 2, 3 and 5, to facilitate the turning of the mower. In order to vary the height of the cut of the mower, the roller may be raised and lowered by means of the adjusting screws 67.

The members 62 and 63 are provided with upwardly and rearwardly inclined sockets 68 and in which the pipes 69 and 70 are welded. The pipes 69 and 70 are secured together in laterally spaced relation by means of the transverse pipe 71 which is welded thereto. The pipe 71 has welded thereto the annular members 72 and 73 which are laterally spaced from each other to fit closely between the tractor frame members 74 and 75, respectively (see Fig. 3), which are provided with half bearing recesses 76 (see Fig. 1) in the bottom thereof adapted to receive the pipe 71. In order to secure the pipe within the bearings, a pair of hooks 77 and 78 are pendulously mounted, as shown at 79 in Fig. 1, to engage the bar 71 and hold it in the recesses 76.

At the rear, the pipes 69 and 70 are bent inwardly, as shown at 80 and 81 thereof, in Figs. 3 and 4, and have welded to the ends thereof vertical bearings 82 and 83 for the ground casters 84 and 85, respectively. Secured to plates 86 and 87 by bolts 86' and 87' which are welded to the pipes 69 and 70, respectively, are cantilever springs 88 and 89 having free curled ends 90 and 91 which ride against the underside of the casings or housings 20 and 21, as best shown in Figs. 1, 2 and 3.

The ground casters 84 and 85 roll on the surface of the ground at each side of the ground wheel, as shown in Figs. 1, 2 and 3, and function as stabilizers for the tractor.

From the foregoing it will be apparent that the entire mower attachment is hingedly connected to the tractor by the transverse pipe 71 so that the mower may move up and down about the axis of said pipe. By pushing downwardly upon the handles 92 and 93, connected to the ground wheel cover 1' by bolts 92' and 93' (see Fig. 1) the mower attachment may be raised from the ground when the weight thereof is balanced by the compression developed in springs 88 and 89. Thus, the mower attachment is resiliently secured to the tractor and may accommodate itself to variations in the ground level where the surface of the ground is higher or lower under the roller 65 than under the ground wheel and the casters. For example, where the surface of the ground slopes downwardly into a level surface, the ground wheel may be supported on the level surface while the roller 65 is beginning to ascend the slope.

Referring to Fig. 1, the main clutch is operated by sliding the sleeve 94 on the handle 93, the sleeve 94 being connected to the rod 38. The speed of the engine is regulated by the throttle lever 95 and the forward speed of the tractor is regulated by the clutch lever 96 which turns the shaft 19 so that the tractor may be driven either through worm wheel 6, or worm wheel 7. When neither of the worm wheels is engaged and the parts are in the position shown in Fig. 6, the transmission is in neutral.

What I claim is:

1. A lawn mower comprising a tractor having a ground wheel; an internal combustion engine, means drivingly connecting said engine to said ground wheel, a grass cutting device comprising a plurality of blades, a frame in which said blades are revolvably mounted, means pivotally connecting said frame to said tractor in advance of said ground wheel to swing freely upwardly about a horizontally extending axis, compression springs cooperating with said tractor and said frame and yieldingly resisting downwardly swinging movements of said frame about said axis, and means operatively connecting said engine to said blades for revolving the same.

2. A lawn mower comprising a tractor having a ground wheel; an internal combustion engine, means drivingly connecting said engine to said ground wheel, a grass cutting device comprising a plurality of blades, a frame in which said blades are revolvably mounted, means pivotally connecting said frame to said tractor in advance of said ground wheel to swing freely upwardly about a horizontally extending axis, compression springs cooperating with said tractor and said frame and yieldingly resisting downwardly swinging movements of said frame about said axis, and means operatively connecting said engine to said blades for revolving the same including a friction clutch and means for adjusting said clutch to slip under a load of predetermined magnitude.

3. A lawn mower comprising a tractor having a single, centrally disposed ground wheel, an internal combustion engine, means drivingly connecting said engine to said ground wheel, a grass cutting device comprising a plurality of blades, a frame in which said blades are revolvably mounted, means pivotally connecting said frame to said tractor in advance of said ground wheel to swing freely upwardly about a horizontally extending axis, compression springs cooperating with said frame and said tractor and yieldingly resisting downwardly swinging movements of said frame about said axis, a ground castor pivotally secured to said frame on each side of said tractor ground wheel and forming a stable support for said tractor, and means operatively connecting said engine to said blades for revolving the same.

4. A lawn mower comprising a tractor having a ground wheel, a tractor frame in which said wheel is rotatably mounted, an internal combustion engine carried by said frame in advance of said ground wheel; said frame having on the bottom thereof in advance of said ground wheel a transversely extending half bearing and a hook pendulously mounted thereon at each end of said half bearing; a grass cutting device comprising a plurality of blades, a mower frame in which said blades are revolvably mounted, including a transversely extending bar detachably secured in said bearing by said pendulously mounted hooks; whereby said frame may swing up and down about the axis of said bearing; compression springs on said mower frame cooperating with said tractor frame and yieldingly resisting downward swinging movements of said mower frame about said axis, means drivingly connecting said engine to said ground wheel, and means drivingly connecting said engine to said blades.

5. The structure set forth in claim 4 in which the means drivingly connecting said engine to said ground wheel and the means drivingly connecting said engine to said blades includes a clutch common to both; and in which the means drivingly connecting said engine to said blades includes a friction driven element and means for adjusting said element to slip under a load of predetermined magnitude.

6. A lawn mower comprising a tractor having a ground wheel; an internal combustion engine, means drivingly connecting said engine to said ground wheel, a grass cutting device comprising a plurality of blades, a frame in which said blades are revolvably mounted, means pivotally connecting said frame to said tractor in advance of said ground wheel to swing freely upwardly about a horizontally extending axis, cantilever springs cooperating with said tractor and said frame and yieldingly resisting downwardly swinging movements of said frame about said axis, transmission means connecting said engine to said ground wheel for driving said ground wheel at different speeds with the same engine speed, and transmission means connecting said engine to said blades for revolving the same at a fixed speed ratio to the engine speed irrespective of the ground wheel speed.

7. A lawn mower comprising a tractor having a single, centrally disposed, ground wheel, a hub on said wheel and bearings in which said hub is rotatably mounted, a worm wheel rotatably mounted on said hub at each side of said ground wheel, an internal combustion engine, separate worms cooperating with said worm wheels for driving said worm wheels at substantially diffent speeds with the same worm speed, means for optionally connecting either of said worm wheels to said ground wheel hub for driving said ground wheel when the other worm wheel is disconnected therefrom, a grass cutting device comprising a plurality of revolving blades, means detachably securing said device to said tractor in advance of said ground wheel, and means including a clutch for operatively connecting said engine to said worms and also to said blades for revolving the latter at a fixed speed ratio to the speed of said engine irrespective of the speed at which said ground wheel is driven.

8. A lawn mower comprising a tractor having a single, centrally disposed, ground wheel, bearings in which said wheel is rotatively mounted, a worm wheel and a bearing therefor at east side of and coaxial with said ground wheel and rotatable independently of each other and said ground wheel, an engine mounted in advance of said ground wheel, a driving shaft extending longitudinally of said tractor at each side of said ground wheel and having a worm thereon cooperating with the adjacent worm wheel; the gear ratios of said worms and their cooperating worm wheels being substantially different; mechanism, including a clutch, for operatively connecting said engine to said shafts, manually operable means for optionally connecting either of said worm wheels to said ground wheel for propelling said tractor at different speeds with the same engine speed; a mower comprising a plurality of revolvable blades, means securing said mower to said tractor in advance of said ground wheel, and mechanism including said clutch for operatively connecting said mower to said engine.

9. A lawn mower, comprising a tractor having a single, centrally disposed, ground wheel provided with an elongated hub, bearings in which said wheel is rotatably mounted, a worm wheel rotatably mounted on said hub at each side of said ground wheel and having a clutch element thereon, a splined shaft axially slidable in said hub and having a clutch element secured thereto at each end in opposed relation to and adapted to cooperate with the clutch element on the adjacent worm wheel, an internal combustion engine mounted in advance of said ground wheel, a longitudinally extending shaft at each side of said ground wheel having a worm thereon cooperating with the adjacent worm wheel; the gear ratio of the worm and its cooperating worm wheel on one side of said ground wheel being substantially different from that of the worm and its cooperating worm wheel on the opposite side of said ground wheel; means, including a main clutch, operatively connecting said shafts to said engine to be simultaneously driven thereby, means for sliding said spline shaft axially of said hub for optionally engaging either of said clutch elements thereon with the clutch element on the adjacent worm wheel, whereby to change the speed at which said ground wheel is driven with the same engine speed, a mower having revolving blades, means pivotally connecting said mower to said tractor to swing up and down about a horizontal axis in advance of said ground wheel, means limiting the downward swinging movements of said mower, and means, including a manually adjustable friction clutch, operatively connecting said blades to one of said longitudinally extending shafts to be driven thereby.

CADWALLADER W. KELSEY.

REFERENCES CITED

The following references are of record in the file of this patent:

UNITED STATES PATENTS

| Number | Name | Date |
| --- | --- | --- |
| 506,685 | Fryer | Oct. 17, 1893 |
| 1,709,791 | Jerram | Apr. 16, 1929 |
| 2,066,174 | Cregier | Dec. 29, 1936 |
| 2,368,290 | Donald | Jan. 30, 1945 |

FOREIGN PATENTS

| Number | Country | Date |
| --- | --- | --- |
| 258,850 | Great Britain | May 12, 1927 |